US008364757B2

(12) United States Patent
Scott et al.

(10) Patent No.: US 8,364,757 B2
(45) Date of Patent: Jan. 29, 2013

(54) SYSTEM AND METHOD FOR ELECTRONICALLY MANAGING AND ROUTING NEWS CONTENT

(75) Inventors: Thomas C. Scott, Simi Valley, CA (US); John C. Chybinski, Wyndmoor, PA (US)

(73) Assignee: Disney Enterprises, Inc., Burbank, CA (US)

( * ) Notice: Subject to any disclaimer, the term of this patent is extended or adjusted under 35 U.S.C. 154(b) by 563 days.

(21) Appl. No.: 11/535,405

(22) Filed: Sep. 26, 2006

(65) Prior Publication Data

US 2008/0077708 A1 Mar. 27, 2008

(51) Int. Cl.
*G06F 15/16* (2006.01)
(52) U.S. Cl. .......................... 709/204; 709/206; 709/246
(58) Field of Classification Search .................. 709/206, 709/204, 246
See application file for complete search history.

(56) References Cited

U.S. PATENT DOCUMENTS

| | | | | |
|---|---|---|---|---|
| 6,311,194 B1* | 10/2001 | Sheth et al. | | 715/236 |
| 6,370,535 B1* | 4/2002 | Shapiro et al. | | 705/27.1 |
| 6,643,663 B1* | 11/2003 | Dabney et al. | | 1/1 |
| 6,766,362 B1* | 7/2004 | Miyasaka et al. | | 709/219 |
| 6,990,633 B1 | 1/2006 | Miyasaka et al. | | |
| 7,268,896 B2* | 9/2007 | Bellagamba et al. | | 358/1.12 |
| 7,386,542 B2* | 6/2008 | Maybury et al. | | 707/3 |
| 7,941,448 B2* | 5/2011 | Eslambolchi et al. | | 707/792 |
| 2002/0056123 A1* | 5/2002 | Liwerant et al. | | 725/87 |
| 2002/0116465 A1* | 8/2002 | Kim et al. | | 709/206 |
| 2002/0138493 A1* | 9/2002 | Shapiro et al. | | 707/100 |
| 2002/0161770 A1* | 10/2002 | Shapiro et al. | | 707/10 |
| 2002/0174230 A1* | 11/2002 | Gudorf et al. | | 709/227 |
| 2004/0059705 A1* | 3/2004 | Wittke et al. | | 707/1 |
| 2005/0049971 A1* | 3/2005 | Bettinger | | 705/51 |
| 2005/0177624 A1 | 8/2005 | Oswald et al. | | |
| 2006/0265427 A1* | 11/2006 | Cohen et al. | | 707/200 |
| 2007/0174398 A1* | 7/2007 | Addante | | 709/206 |
| 2007/0198353 A1* | 8/2007 | Behringer et al. | | 705/14 |
| 2007/0198943 A1* | 8/2007 | Grason et al. | | 715/776 |
| 2009/0019085 A1* | 1/2009 | Abhyanker | | 707/104.1 |

OTHER PUBLICATIONS

International Search Report for Application No. PCT/US07/77027 mailed on Mar. 14, 2008; 1 page.
Written Opinion for Application No. PCT/US07/77027 mailed on Mar. 14, 2008; 5 pages.
International Preliminary Report on Patentability for Application No. PCT/US07/77027 mailed on Mar. 31, 2009; 6 pages.

* cited by examiner

*Primary Examiner* — John Follansbee
*Assistant Examiner* — Anthony Mejia
(74) *Attorney, Agent, or Firm* — Philip H. Albert; Kilpatrick Townsend & Stockton LLP

(57) ABSTRACT

Techniques that enable automated processing of news content. A client device receives news content and configures a message for processing by a server. A user of the client device can assign one or more processing attributes to the news content such as scheduling, formatting, or delivery attributes. A message with the news content and assigned attributes is configured according to a predetermined format and transmitted to the server. The server receives the message and may automatically process the news content based upon information contained in the message. Output from the server may be distributed for use at one or more newsrooms.

14 Claims, 10 Drawing Sheets

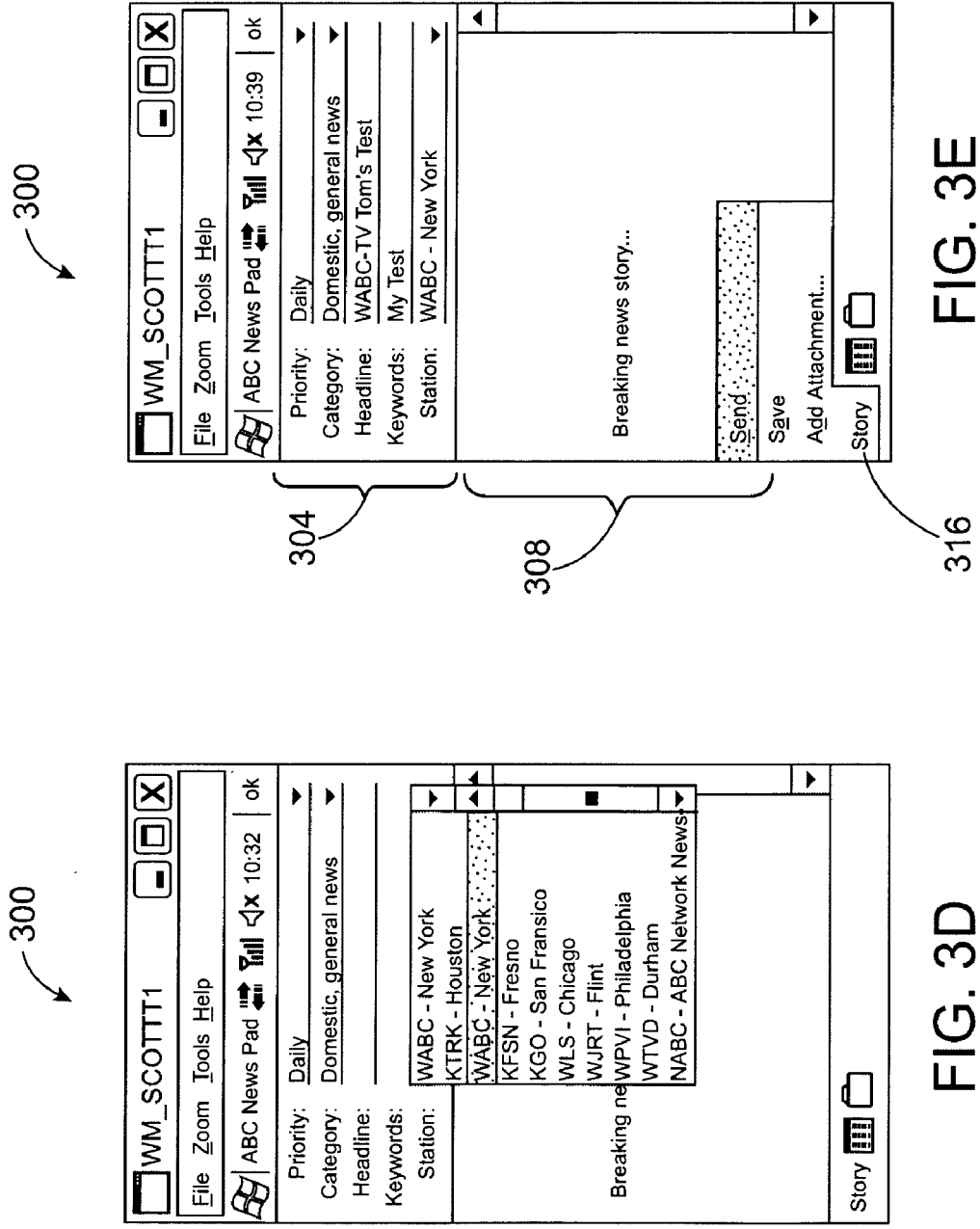

```xml
<?xml version="1.0" encoding="utf-8" ?>
= <Start>
<Time>2006828192432</Time>
```
504 — `<Device>WM_REPORTER</Device>`
508 — `<User>Charles Gibson<User />`
512 — `<Station>WABC - New York</Station>`
516 — `<Body>Reference: https://newspad.domain.com/Attachments/testing-crlf-13-Waterfall.jpg Contact: Charles Gibson testing to network news line 1 line 2 line 3 line 4 or lf fix testing</Body>`
520 — `<ServiceLevel>a</ServiceLevel>`
```
<StoryNumber>73bd690d-1117-4cbl-afca-414272179e61</StoryNumber>
```
524 — `<FormatVisualArea />`
528 — `<Priority>f</Priority>`
532 — `<Category>a</Category>`
536 — `<Keyword />`
```
<Version>13</Version>
<Reference />
```
540 — `<Title>Test Message - crlf</Title>`
```
<Received>8/28/2006 7:27:13 PM</Received>
<Attachments>https: //newspad.domain.com/Attachments/testing-crlf-13-Waterfall.jpg</Attachments>
</Start>
```

FIG. 5

```
☐☐☐a9e61nwspd
f a☐☐            13   08-28 0000
☐testing to abc network news - crlf
Reference: https://newspad.domain.com/Attachments/testing-crlf-13-Waterfall.jpg
Contact: Charles Gibson testing - breaking story - for immediate wire service distribution line 1
line 2
line 3
line 4 cr lf fix testing    ☐2006828192432
        ☐
```

FIG. 7

```
<SYN><SYN><SOH>{Service level}a{Story number}0000<TFI>
{Selector code}x-xxx<LF>
{Priority}b<SP>
{Category}a{Format}<DC2><SP>
{Keyword}testing<SP>
{Version}b|t<SP>
{Reference}<SP>
{Filing Date}08-28<SP>
{Word count}8<CR><LF>
<STX>
{Text}breaking story - for immediate wire service distribution
<ETX>
{Transmission date}
<EOT>
```

FIG. 8

SYSTEM AND METHOD FOR ELECTRONICALLY MANAGING AND ROUTING NEWS CONTENT

BACKGROUND OF THE INVENTION

The present invention relates generally to data processing and, more specifically, to processing, managing, routing, and distributing news content.

Before the wireless revolution in the latter part of the twentieth century, reporters regularly relied upon telegraph, telex, messenger services, wired telephones, facsimile or the like, to report their stories (news content) to news rooms. One limiting factor, however, was that it always required the reporters to be in one spot while writing or reporting the news content.

With the wide-spread availability of wireless communication devices, such as portable telephones, wireless computer connections, or the like, reporters can now write and report news content "on the go." Thus, for example, a reporter may cover an event in the field, and while traveling to their next assignment, the reporter may write-up their story on a computer, a PDA, or the like. When finished, the reporter may wirelessly e-mail the news content to the news room.

Within the new wireless paradigm, the inventors of the present invention have recognized that in addition to receiving the timely news content from reporters, it is just as important for the newsroom to quickly get the news content published (e.g. on-the-air, in-print, web post). Currently, however, the inventors have realized that a substantial amount of human intervention is typically required to transform the news content received from the reporters to something that is publishable. Such tasks may be labor intensive.

The inventors recognize that burden of human intervention may be magnified when the news content from the reporter is distributed to more than one newsroom (e.g. network affiliate). In some cases, each newsroom may have its own criteria for importance of stories, their own formatting requirements, or the like. Because of this, each newsroom would have to manually analyze each e-mailed news report, and reformat the news content in an appropriate manner.

As is understood by the inventors, the value of news often diminishes with the passage of time. For example, news agencies compete fiercely to "scoop" the competition. Accordingly, delay in processing and distributing news content in this competitive environment may have harmful economic consequences.

In light of the above, a system, method, and apparatus, that can process news content quickly and efficiently is desired.

BRIEF SUMMARY OF THE INVENTION

The present invention relates to automatic data processing and publishing of news content. More specifically, the present invention relates to automatic processing, managing, routing, and distributing of news content to news destinations (e.g. newsrooms).

In various embodiments of the present invention, automated processing of news content is disclosed. In some embodiments, a client device receives news content from a user (e.g. reporter) and, using appropriate software, configures a message (including the news content) for processing by a server. In some embodiments, the client device presents a list of processing attributes for selection by a user. These processing attributes may include one or more attributes related to the scheduling, formatting, or delivery of the news content. In such embodiments, the client device uses the selected attributes and configures the message according to a predetermined format required by the server. Subsequently, the message is transmitted to the server. In various embodiments, the server receives the message in the predetermined format and automatically processes the news content based upon attributes and news content contained in the message. The server reformats the news content into a standardized format and then distributes the news content in the standardized format to one or more newsroom servers.

One technique may include receiving news content from a user of the client device and assigning attributes to the news content. In various embodiments, the attributes are selectable from a set of attributes recognized by the server. Text and multimedia elements may also be included as part of the news content. In some embodiments, the assigned attributes may include one or more of scheduling attributes, formatting attributes, delivery attributes, and the like. Various processes may include configuring a message with the news content and the assigned attributes. Typically, the message is formatted in a predetermined format understood by the server for automated processing. The method may also include the client device wirelessly connecting to the server and transmitting the message to the server for automated processing by the server according to the assigned attributes. In some embodiments, the message is transmitted by the client device to the server via the Internet.

In various embodiments of the present invention, a list of attributes is presented to the user of the client device via a simplified graphical user interface. Some of these attributes may correspond to fields of the American Newspaper Publisher Association (ANPA) format. These attributes may facilitate timely news room publication of the news content by using wire service transmission protocols to bypass manual intervention and formatting of the news content typically performed by news rooms.

In various embodiments, methods may include configuring the message according to the predetermined format by using XML tags. In additional embodiments, the messages may also be encrypted before it is transmitted to the server for automated processing.

In various embodiments, the method includes capturing audio and video data ("multimedia data") for inclusion with the news content. In such embodiments, the multimedia data may be provided to the server together with the messages, or before or after the messages have been transmitted. In other embodiments, a link to the multimedia news content may be included with the one or more messages.

According to other aspects of the present invention, methods for automated processing of messages encapsulating news content at a server are described. Various processes may include receiving a message containing news content and a predetermined set of attributes. In some embodiments, the set of attributes may include information sufficient to process the news content for distribution by a wire service. Techniques may include scheduling aspects of the news content for electronic distribution to at least one destination system based upon the set of attributes for the news content. Techniques may also include identifying specific capabilities of destination systems. The techniques may also include producing formatted output from the news content according to the set of attributes of the news content and according to the capabilities of the destination system. In various embodiments, the capabilities of the destination system may be related to its ingest requirements. The server may transmit the formatted output to the destination system over a computer network via a LAN, a wide area network such as the Internet, or the like.

According to other aspects of the present invention, methods for automatic processing in a server are disclosed. A process may be initiated automatically upon receiving the message in the predefined format from the client. The technique may include processing the message to determine one or more defined attributes, and then formatting an output message based upon the one or more defined attributes. In addition, the output message may be produced according to requirements of the destination server (e.g. newsroom). In various embodiments, the server may selectively distribute the news content based upon the set of attributes and other information in the message. In various processes, the formatted output from the server conforms with ANPA wire service transmission guidelines. In various embodiments, the message may include XML data and at least some of the attributes may be represented by XML tags. In some methods, the server sends a confirmation or acknowledgment message to the client device when the server successfully receives the message with the news content, and/or when the server successfully sends the output message to one or more destination servers.

In various embodiments, news content may include both text and multimedia elements. Accordingly, in some embodiments, the method may include distributing the multimedia elements as part of, or in addition to, the message in the predetermined format. The method may also include storing a copy of multimedia elements in a database and creating an index of the stored multimedia elements based, at least partly, upon the set of attributes. In various embodiments, capabilities of a destination systems are determined, and the multimedia elements are processed in the server according to the capabilities of the destination systems. Techniques may include distributing the processed multimedia news content/elements with, or in addition to, the formatted output. A link may alternatively be provided to the multimedia news content.

These and other embodiments of the invention along with many of its advantages and features are presented in more detail in the description below and in conjunction with the attached figures.

BRIEF DESCRIPTION OF THE DRAWINGS

FIGS. 3A-3E depict a user interface of a client news gathering device according to an embodiment of the present invention; FIG. 3A shows a first state of the user interface; FIG. 3B shows a second state; FIG. 3C shows a third state; FIG. 3D shows a fourth state; and FIG. 3E shows a fifth state.

FIG. 5 illustrates one possible message produced by a client news gathering device according to the present invention.

FIG. 7 shows one type of formatted output produced according to an embodiment of the present invention.

FIG. 8 is a pseudo code representation of exemplary formatted output produced according to one embodiment of the present invention.

In the figures, similar components and/or features may have the same reference label. Components of the same type are separately identified by following the reference label by a secondary designator such as a lowercase letter (e.g., 110*a*, 110*b*, . . . 110*n*). If the reference label and secondary designator are both included, the ensuing description is applicable to the specific component or feature. Alternatively, if only the reference label is used, the description applies to any of the similar components having the same reference label.

DETAILED DESCRIPTION OF THE INVENTION

Figure 1:
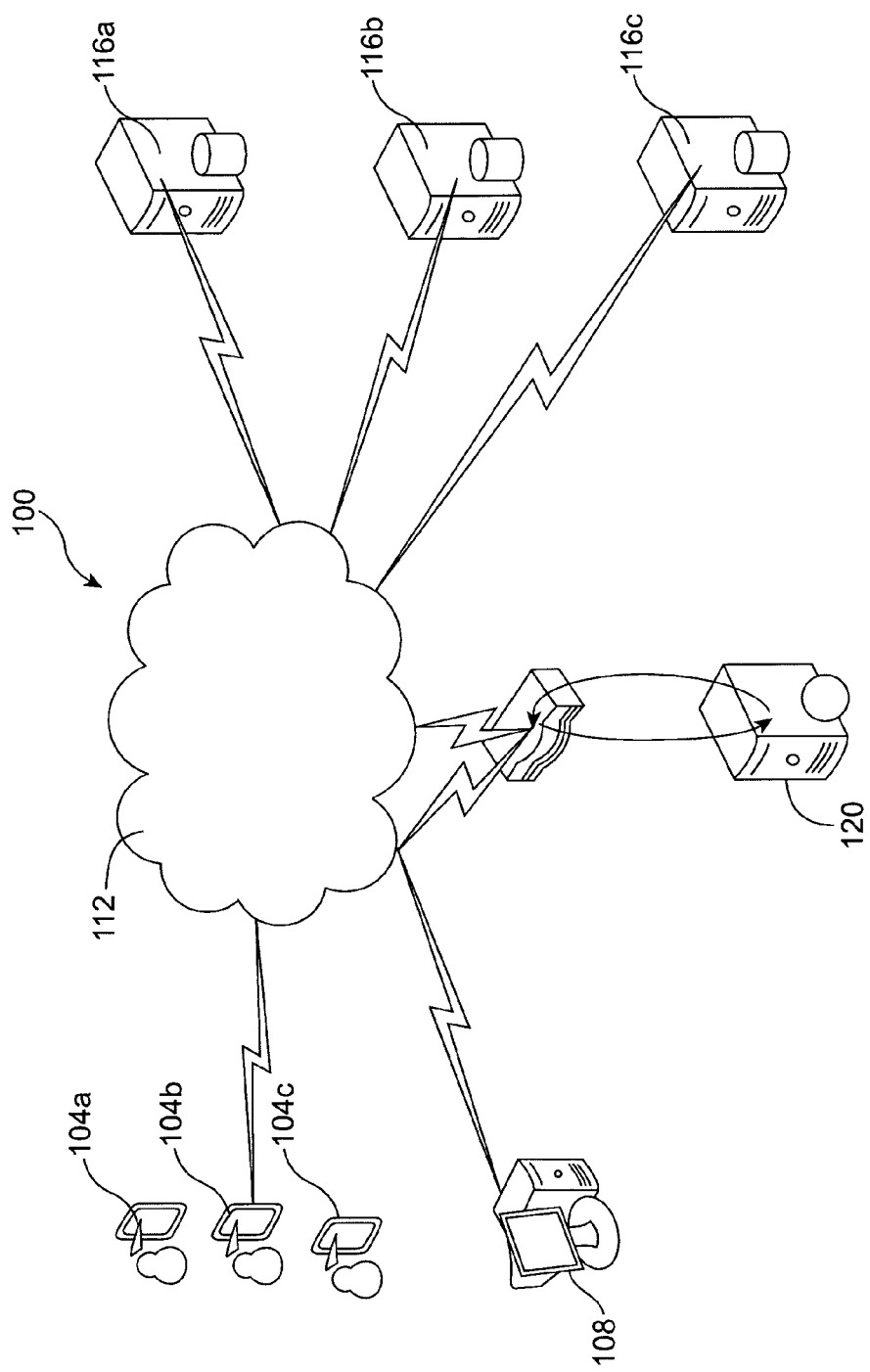
FIG. 1 is a simplified block diagram showing a remote news delivery system according to embodiments of the present invention.

FIG. 1 is a simplified block diagram showing a remote news delivery system 100 according to one embodiment of the present invention. In this embodiment, messages with news content travel from client device 104, and acknowledgements and other messages might travel to client device 104.

Briefly, reporters may use client devices 104 to create "news content." Client devices 104 then configure and transmit one or more messages with the news content to an orchestrating server 120 for processing. These one or more messages are configured according to a predetermined format, and may be sent to orchestrating server 120 via a communications channel, such as network 112. Orchestrating server 120 receives the client messages, processes the news content, and delivers formatted output to one or more newsroom servers 116. In some embodiments, the process is automated and once news content is entered by a user (e.g. reporter), the news content travels to the one or more newsrooms without additional human intervention.

In a typical situation, each reporter uses a client device 104 to create news content. News content may include, among other items, text entry by a user, an audio recording, photographs, video clips, or the like. In various embodiments, these and other types of electronic data comprise the news content.

In various embodiments of the present invention, client devices 104 may include personal digital assistants (PDAs), tablet computers, pocket personal computers, smart phones, notebook computers, and the like. As examples, client devices 104 may be embodied as: a PALM TREO, an HP IPAQ, a BLACKBERRY X000 series, a T-MOBILE SIDEKICK, a laptop computer, or the like. In various embodiments, client devices 104 may be capable of capturing audio clips, video clips, images, etc. in an internal memory. The internal memory may also be used to storing text. A network adapter for exchanging messages with orchestrating server 120, client software (e.g., a "thin client"), and the like may also be included.

In various embodiments, client device 104 may include text entry capability via alpha-numeric buttons, numeric keypads, gestures, voice recognition, predicative text entry, or the like. In various embodiments, a reporter may type a news story directly into client device 104 for upload to orchestrating server 120 directly using a text entry capability of the client device 104, or via object linking, embedding, cutting-and-pasting, or similar operations.

In various embodiments, client device 104 may also be configured to associate audio and/or video data with the text of a particular news story. Thus, for example, client device 104 may create news content that includes a text element produced by the text entry capability and one or more multimedia clips and/or still images associated with the text element.

After the news content has been created, client device 104 configures a message for transmission to orchestrating server 120 in a predetermined (an agreed) format. In various embodiments, the message may include the news content and additional data to facilitate processing operations of the server. For example, the additional data may contain attributes for classifying, scheduling, formatting, routing, and/or delivering the news content to one or more destinations. These attributes may be specially selected for use with a particular server, or they may be recognized by a group of servers. Further detail about these message attributes will be discussed below.

In the example in FIG. 1, client devices 104 transmit messages with news content and processing attributes to orchestrating server 120 via network 112. In some embodiments, these messages include data and attributes described using XML (Extensible Markup Language) data tags. In light of the present patent disclosure, the inventors believe that one of ordinary skill in the art would recognize that other types of data tagging schemes may be utilized in other embodiments. Accordingly, descriptions of particular message formats and data structures are included to illustrate specific embodiments of the invention and do not restrict its scope or application.

In various embodiments of the present invention, network 112 may include, among other possibilities, the Internet, a wide area network, a local area network, VPN, or the like. In some embodiments, client devices 104 may access network 112 through any of various wired or wireless network adapters such as a telephone modem, Ethernet, IEEE 802.11x, CDMA, GSM, WiFi, IR, 4G, satellite link, cellular network adapters, and the like. For sake of simplicity within the present disclosure, network 112 may be the Internet and may used interchangeably with the Internet in the following discussion.

In the embodiment in FIG. 1, orchestrating server 120 manages the processing and delivery of news content contained within messages received from client devices. In response, messages are processed according to one or more of the attributes they contain, and formatted output is produced. In some examples, attributes may indicate classification data, scheduling data, formatting data, routing data, and the like. In response, orchestrating server 120 may apply one or more attributes to the news content in the message to form the formatted output. The orchestrating server then distributes the formatted output to one or more newsroom servers 116, as shown.

As discussed here, orchestrating server 120 typically performs these actions automatically, and thus human intervention is not required. In this respect, the system functions autonomously and intelligently to process the news content and to expedite its delivery to the appropriate destinations in a ready-to-use format.

In some embodiments of the present invention, orchestrating server 120 implements rules-based processing of client messages. For example, if a client message includes XML data, orchestrating server 120 may process the XML data according to an XSL (Extensible Stylesheet Language) stylesheet. In various embodiments, the orchestrating server may also include one or more program modules that perform additional processing of the message. It should also be noted that orchestrating server 120 may accept client messages in multiple formats. In various embodiments, orchestrating server 120 is configured to receive messages having different formats at different ports, possibly with different network protocols.

As shown in FIG. 1, a remote access terminal 108 may also be provided to manage the operation of orchestrating server 120. Orchestrating server 120 may allow a system administrator, using remote access terminal 108, to modify distribution options, add stylesheets, change processing rules, and perform other administrative and system maintenance tasks. In some embodiments, remote access terminal 108 may be used to specify which newsroom servers 116 will receive news content. For example, remote access terminal 108 may specify that only newsroom servers 116 associated with television stations receive news content, only newsroom servers 116 associated with print media receive news content, only newsroom servers 116 associated with web publications receive news content, and the like. In various embodiments, orchestrating server 120, remote access terminal 108, and newsrooms servers 116 may be physically separated and remote from one another and/or may be protected by firewalls and other security measures.

Figure 2:
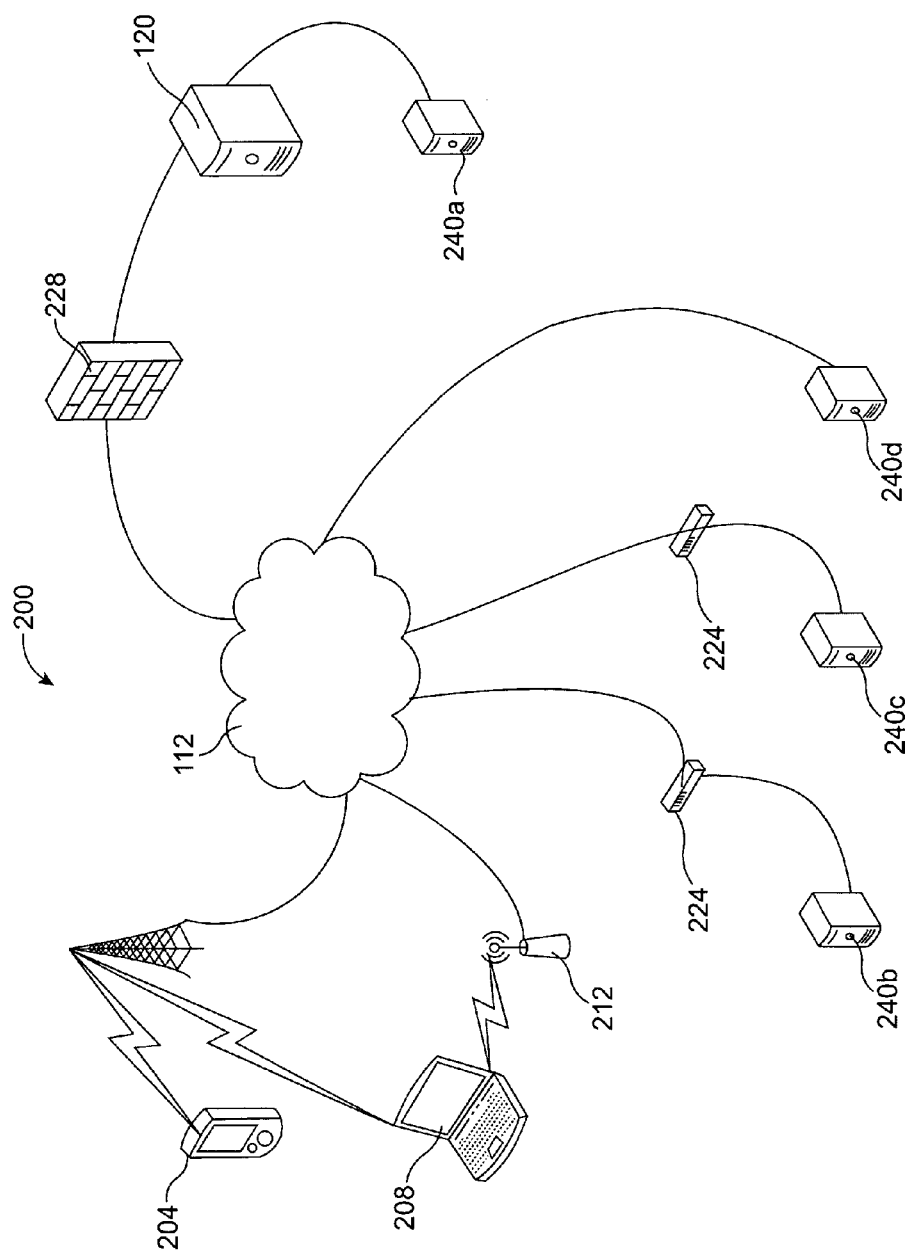
FIG. 2 is simplified block diagram showing another embodiment of a remote news delivery system according to embodiments of the present invention.

FIG. 2 is a simplified block diagram showing another embodiment of a remote news delivery system 200 according to the present invention.

Similar to the example in FIG. 1, news reporters can create news content with client devices 204, 208. As shown, client devices 204, 208 may have different hardware configurations and capabilities. For example, client 208 may represent a notebook computer including a programmable processor, memory, disk storage, keyboard, and display panel. Client 208 may further include a wireless network adapter that provides access to Internet 112 through a wireless communications network 216 (e.g., cellular network, CDMA network, GSM network). In addition, client 208 may include a wireless computer network interface, e.g., a WiFi interface, WiMAX interface, or the like, for network communications exchanged via a wireless access point 212.

In various embodiments, client 204, is a light-weight device with a limited feature set. For example, client 204 may be embodied as a smart phone, a PDA, a Blackberry-like device, or the like, and may provide primarily those features needed to gather and submit news content over communications network 112.

In various embodiments, when a client 204, 208 has a message that is ready for transmission, it may locate and request authentication from an appropriate orchestrating server 120. In some embodiments, each client may be pre-configured to communicate with orchestrating server 120 at a known address and/or using a known protocol. Alternatively, a user may enter this information.

In various embodiments, any open or proprietary system may be used by orchestrating server 120 to provide secure authentication of the client and data encryption services for the message from the client. These services, for example, may require username, password, cryptographic key, digital certificate, or a similar input of information from the user (reporter). In one embodiment, orchestrating server 120 includes generic process management software such as Biz-Talk Server 2006™ from Microsoft Corporation. Additionally, clients 204, 208 communicate with orchestrating server 120 using a secure implementation of the hyper-text transport protocol (https).

As shown in FIG. 2, a firewall 228 may be disposed between orchestrating server 120 and Internet 112. Firewall 228 may provide enhanced security and may be used to create a demilitarized zone (DMZ) or perimeter network from which orchestrating server 120 may operate. In light of the present disclosure, it is believed that persons of ordinary skill in the art will recognize that use of a DMZ and additional security measures may be advantageous, particularly when orchestrating sever 120 is further connected to an internal corporate network.

In various embodiments, orchestrating server 120 may be directly or indirectly coupled with one or more newsroom servers 240. As shown, orchestrating server 120 communicates with remote newsroom servers 240b, 240c, 240d via a communications network 112 (e.g. the Internet). It various embodiments, that newsroom servers 240 may be almost any type of computing device and may vary widely in their particular capabilities.

In various embodiments, orchestrating server 120 interacts with each newsroom server 240 in a transparent manner. In other words, from the newsroom server perspective, little, if any, modifications or special accommodation in configuration is necessary to receive the formatted output from orchestrating server 120. As mentioned above, in various embodiments, orchestrating server 120 manages individual variations in requirements of each newsroom server 240, and distributes the news content to each destination newsroom server 240 in a readily usable format.

In various embodiments, orchestrating server 120 prepares news content for distribution to one or more newsroom servers 240 in a standard wire service news format. The ability described herein to distribute news content in a standard wire service format provides many advantages as wire services are well-established in the news industry. In one embodiment, orchestrating server 120 produces formatted output in a serialized ANPA format. Further information about this format (hereinafter "the ANPA format") may be found in Special Report Number 89-3 published on Jul. 10, 1989 by the American Newspaper Publishers Association (ANPA), now part of the Newspaper Association of America (NAA). In other embodiments, the formatted output may be in the form of an RSS feed or other syndication mechanism.

In one embodiment illustrated in FIG. 2, newsroom server 240a may be connected directly to a serial port on orchestrating server 120. For example, a null-modem cable may provide the physical connection that enables handshaking and serial data transmission between orchestrating server 120 and newsroom server 240a. In this embodiment, messages with news content are received from remote clients 204, 208 over Internet 112, orchestrating server 120 processes the messages and prepares formatted output that is suitable for wire service distribution, and then the formatted output is transmitted serially by orchestrating server 120 to newsroom server 240a.

In additional embodiments, newsroom server 240a, itself, may further distribute the formatted output to other wire service participants. In various embodiments, once the news content is formatted in the wire service format, little, if any, human intervention is required within the newsroom to automatically schedule, route, or publish the formatted output. Since the news content is formatted as a wire service news item, it can be transported and received by diverse newsroom servers without human intervention.

As is also illustrated in FIG. 2, orchestrating server 120 may also distribute the formatted output to remote newsroom servers 240b, 240c, 240d via computer network 112. As shown, some remote newsroom servers 240b, 240c may be coupled to conversion devices 224 that receive data packets (e.g., IP packets) from network 112 and convert them into a serial data stream. Conversion devices 224, for example, may be connected to a serial port on their corresponding newsroom servers. In this arrangement, data packets may be received from communications network 112, transformed to a serial data stream, and then communicated to newsroom servers 240b, 240c. From the newsroom server perspective, the serial data may appear to be a standard wire service transmission, e.g., the ANPA format, described above. In this manner, in various embodiments of the present invention, orchestrating server 120 effectively functions as a source of wire service news. Thus, news content that is submitted by a field reporter using a client device may be automatically formatted (by orchestrating server 120) as a standard wire service news item and transmitted to one or more newsroom servers 240.

Figure 3C:
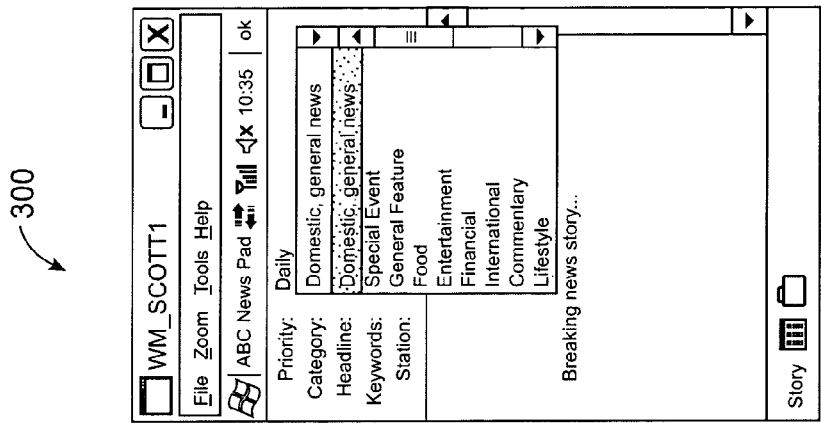
Figure 3B:
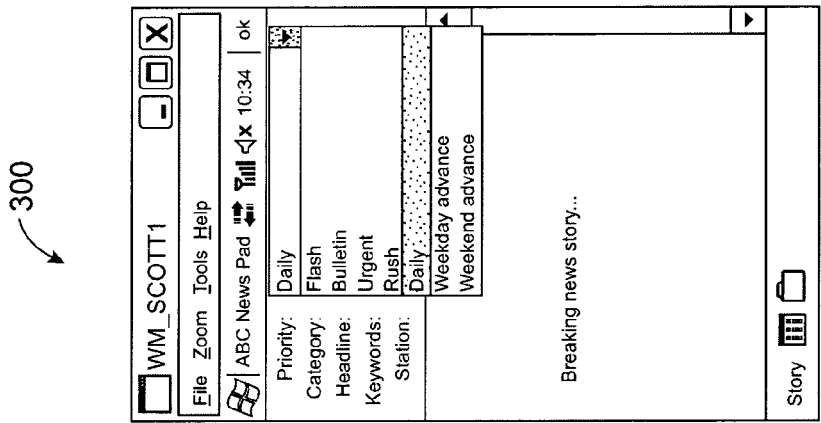
Figure 3A:
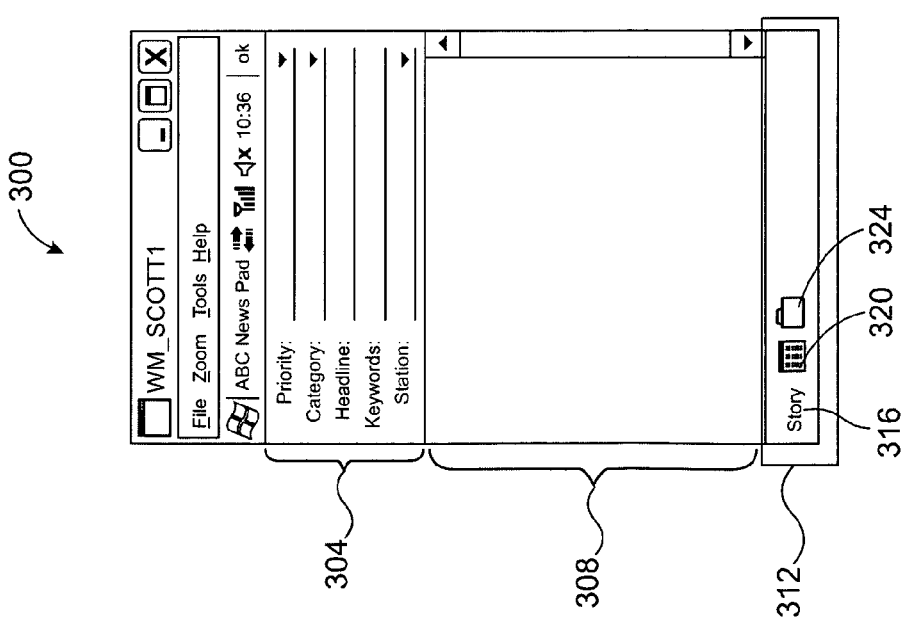

FIGS. 3A-3E depict various user interfaces of a client news gathering device according to embodiments of the present invention. With reference to FIG. 3A, different functional portions of user interface 300 are depicted, including an attribute assignment portion 304, a news entry portion 308, and a menu bar portion 312. Menu bar 312 further includes a Story button 316 and multimedia capture buttons 320, 324.

In various embodiments, news entry portion 308 is adapted to receive text input of a news story and may provide various text processing capabilities according to the task being performed. In some embodiments, a light-weight client with only minimal text-based formatting may be used. Light-weight clients may require fewer system resources and thus are useful on hand-held devices. In some specific embodiments, a client news gathering device may be adapted for use with WINDOWS CE, PALM OS, EPOC, and similar operating systems.

With reference to FIG. 3B, attributes are selected for assignment to news content from assignment portion 304 of user interface 300. As shown, individual attributes including Priority, Category, Headline, Keywords, and Station are presented for selection by a user. These attributes may represent a subset of the attributes recognized by orchestrating server 120. In some embodiments, a larger number or a smaller number of attributes may be presented, and the attributes presented for assignment may vary according to the eventual destination of the news content. In the exemplary embodiment shown, some of the attributes in assignment portion 304 correspond to fields of the ANPA format and may be used by orchestrating server 120, among other possibilities, to produce output in the ANPA format.

In FIG. 3B, a number of possible selections are shown for the Priority attribute. In this example, the attribute is assigned the value "Daily". In various embodiments, the Priority attribute is used in a number of ways. In one way, an orchestrating server places news content its receives into a processing queue based upon the value of the Priority attribute. Thus, for example, if the Priority attribute is set to "Flash" or "Urgent", the orchestrating server may schedule the news content for immediate processing and delivery, ahead of news content with the Priority attribute set to "Daily."

In various embodiments, the Priority attribute may also be used when an orchestrating server produces formatted output. In some embodiments, the orchestrating server may add information to the formatted output based upon the value of the Priority attribute. This added information may signal the destination newsroom server that receives the formatted output to take some specific action. For example, the orchestrating server may add information to the formatted output that causes a newsroom server to generate a pop-up dialog box or audible alarm when formatted output is received with the Priority attribute set to "Urgent." Similarly, the orchestrating server may add information to the formatted output that can be used by the newsroom server to select a storage location for storage of the formatted output. In various embodiments, the storage location may be used to store news content that has an associated embargo date.

FIG. 3C depicts assignment of the Category attribute. As illustrated, various news categories are presented for selection by a user. These categories may be used by an orchestrating server to control distribution and formatting of the news content. For example, using the Category attribute, news content may be formatted based upon category and/or intended audience. In some embodiments, the Category attribute may be used to provide additional formatting information appropriate to the type of news content.

In various embodiments of the present invention, text box elements may be provided for assigning values to the Headline and Keywords attributes. In other embodiments, a pre-specified list of words may be used for the Headline and/or Keyword attributes. In some embodiments, the Headline attribute may be used by an orchestrating server when formatting the news content and may, for example, represent the title of a news story. Keywords, on the other hand, may be used for various purposes including revision tracking and indexing news content in a system database. For example, upon receiving a message containing news content, orchestrating server 120 may add or update a record in a news database and/or media library with reference to the Keywords attribute and other identifying information. In some embodiments, if the news content includes both text and multimedia elements, orchestrating server 120 may index the text element and create a link to the multimedia element in the system database referencing the Keywords attribute.

FIG. 3D depicts assignment of the Station attribute. In various embodiments, the Station attribute may be used by the reporter to specify one or more recipients of the news content. In some embodiments, the Station attribute may include distribution lists or distribution aliases for routing the news content to multiple destinations (e.g., some or all ABC affiliates). In some embodiments, the Station attribute may be used to group-together destination servers having common ingest requirements. In other words, the station attribute may specify stations that have a destination server requiring data in a first format, stations that require data in a second format, or the like. In various embodiments, orchestrating server 120 may also use the Station attribute as a key value to retrieve information about the ingest requirements of the particular newsroom server from a database or other storage area.

FIG. 3E shows one example of news content that is ready for transmission to an orchestrating server. In this example, attributes are selected for assignment to the news content and Story button 316. As illustrated, three options are available. The client device may send the news content (story) for processing by the orchestrating server or may Save the news content as directed by a user. Also shown is an option to Add Attachment, which will be discussed in connection with FIGS. 4A-4C, below.

In various embodiments of the present invention, when Send is selected, the client configures a message for transmission to the appropriate orchestrating server. The client message may contain the news content, including text and multimedia elements, the attributes selected for the message, and the like. In some embodiments, the message includes XML data and at least some of the attributes are represented by XML tags. Thus, while the client message is typically configured according to a predetermined format that is specified by the orchestrating server, this format may vary and a strict ordering of the message data will not always be required. After the client has configured the message, it is transmitted over a communications channel to the orchestrating server for processing of the news content according to the assigned attributes.

While specific attributes are shown for purposes of illustration, in light of the above disclosure, it will be recognized that many different attributes are possible within the scope of the invention. Attributes, for example, may vary based upon capabilities of the client device, the orchestrating server, the newsroom server, or any combination thereof. In addition, particular attributes may correspond to a particular type of news content and/or intended audience. Also, it will be noted that attributes may be selected or assigned as a group. For example, a client device may provide a template for use in assigning a collection of attributes to particular types of news content.

Figure 4C:
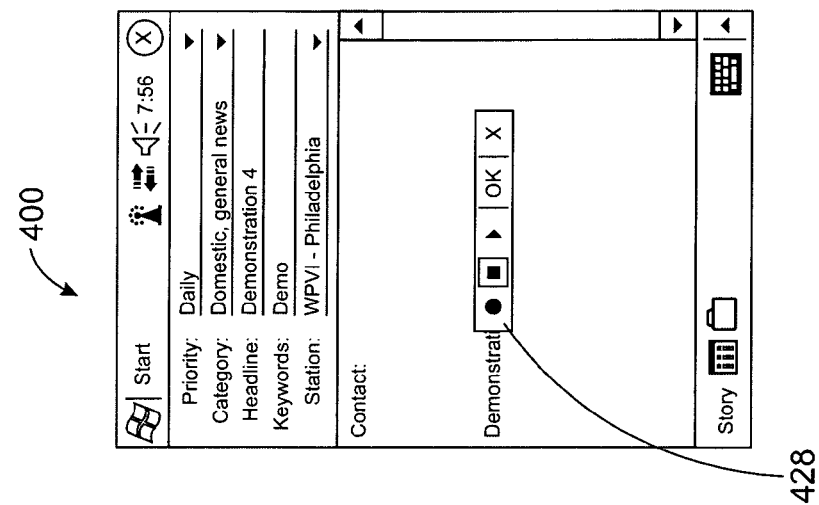
FIGS. 4A-4C depict further embodiments of a client user interface according to an embodiment of the present invention.
Figure 4B:
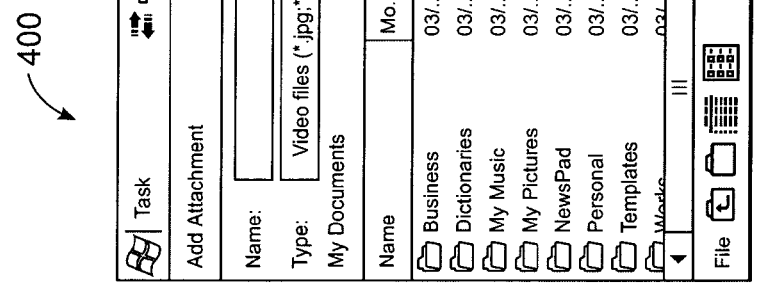
Figure 4A:
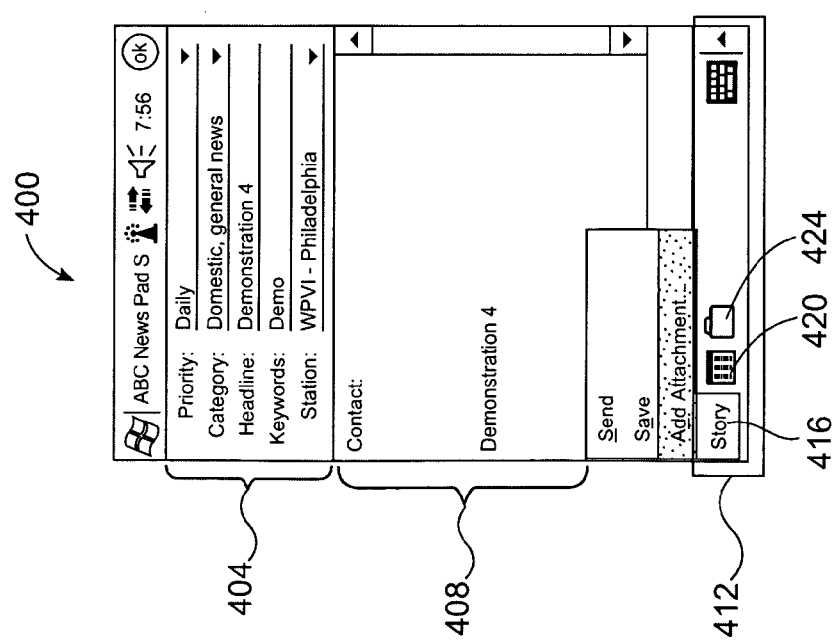

FIGS. 4A-4C depict further embodiments of a client user interface according to embodiments of the present invention. Various embodiments illustrate a way in which multimedia elements are selected for inclusion as news content through the client device. In the present example, FIG. 4A illustrates that text of a news story is entered in news entry portion 408 and that attributes are set in assignment area 404. Story button 416 is pressed in menu bar 412 and Add Attachment is selected in the menu. At this point, one or more stored multimedia elements may be selected for inclusion as part of the news content.

As shown in the GUI of FIG. 4B, multimedia elements may be selected from various formats of audio and video data. For example, an .AVI video, .MPG, .MOV clip, or the like, may added to the text of a news story. Similarly, one or more images or audio recordings may be added to the news content. These multimedia elements may be selected individually or as a group. As shown in the embodiment of FIG. 4C, multi-media news content can be captured through the client device and associated with text of a news story in one operation. In some embodiments, this may be accomplished by pressing either video capture button 420 or audio capture button 424 to capture the multimedia news content, and then associating the content while the text of the news story is being entered/edited. The embodiment illustrated in FIG. 4C shows an audio recording toolbar 428 provided by the client device for this purpose.

FIG. 5 illustrates an example of a message 500 produced by a client news gathering device according to an embodiment of the present invention. In this example, message 500 includes data in which various attributes are identified by XML tags. Attribute names are enclosed within pairs of angular brackets and attribute values appear between pairs of attribute names. When the angular brackets are expressed as pairs, a first element opens the pair and a second element closes the pair. Thus, line 504 describes an attribute named "Device" set to the value "WM_REPORTER". Similarly, line 508 indicates that attribute "User" has been set to the value "Charles Gibson". Together, the User and Device attributes may uniquely identify the reporter and the client device. In various embodiments, this information may be used by the orchestrating server to authenticate the user and client device.

Referring back to FIG. 4A, attributes selected through assignment area 404 are interspersed with additional message data in message 500. For example, line 528 may correspond to the Priority attribute in assignment area 404. This attribute has been set to the value "f" which, in an ANPA wire system, may represent the Flash news priority. Similarly, at line 540, the Title attribute has been set to "Test Message" and, at line 512, the Station attribute is set to "WABC-New York." At line 532, the Category attribute is set to the value "a" which, in an ANPA wire system, for example, may indicate a domestic general news item. Additionally, as shown at line 536, the Keywords attribute has not been set. This may indicate that no keywords were provided in assignment area 404.

Additional data relating to the formatting, scheduling, and delivery of the news content may be included as part of message 500. For example, specific output formats may be indicated by tagged attributes. In the present example, line 516 includes a link or location of an image, along with contact information for the reporter. In addition, in line 516, the text "line 1, line 2, line 3, line 4, cr If fix testing" represents the news content. As shown, formatting instructions may be included inline with the text of the news content. Line 524 shows the FormatVisualArea attribute which, in various embodiments, may be used to hold special output device information or may indicate how to format the news content for a particular purpose. The ServiceLevel attribute is shown at line 520. ServiceLevel may be used for a variety of purposes such as indicating the scope of distribution and special handling instructions for news content.

The invention is not limited to one particular message format and many alternative message formats are possible. Thus, although various attributes have been described with reference to the ANPA format, the use of attributes corresponding to alternative distribution formats is specifically contemplated. For example, attributes for use with the News Industry Text Format (NITF) and attributes directed to other news industry specific formatting are within the scope of the present invention.

Figure 6:
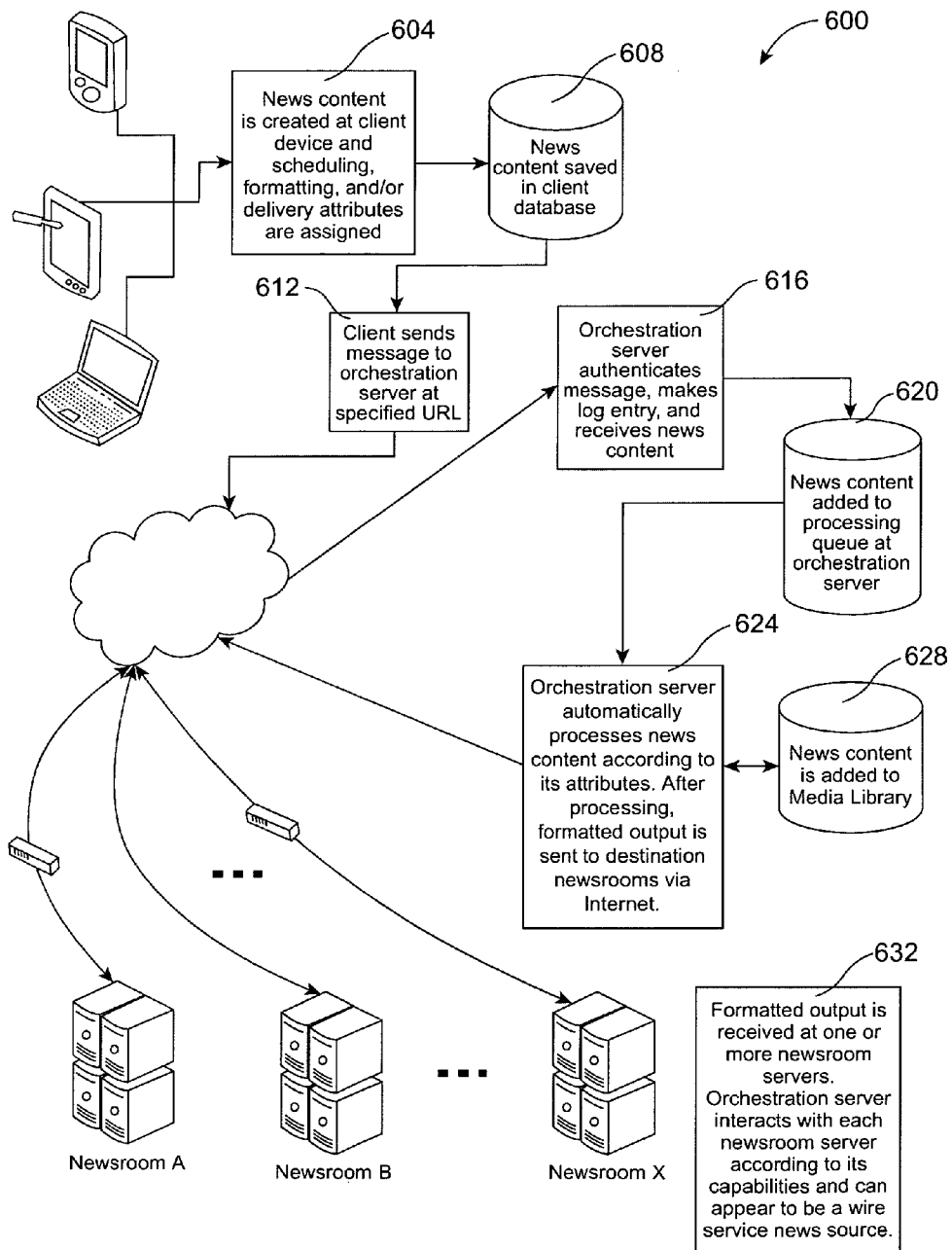
FIG. 6 is a data flow diagram illustrating how a news content message travels from a client device to a newsroom server according to one embodiment of the present invention.

FIG. 6 is a data flow diagram illustrating how a news content message travels from a client device to a newsroom server according to various embodiments of the present invention.

Box 604 shows that news content is created using a client device. The news content may include both text and multimedia elements. Also, the client device may permit assignment of various attributes that indicate how to process the news content and where the processed output should be delivered. As shown at box 608, the client device saves a local copy of the news content, for example, multimedia data may be stored.

At box 612, the client configures a message including the news content and assigned attributes and sends it to an orchestrating server. The computer address of the orchestrating server, for example, may be specified by a default URL or other URL provided by a user. Alternatively, the orchestrating server may be identified according a network address and port number. The client may communicate with the orchestrating server using one or more network protocols.

When the client message is received at the orchestrating server, it may be authenticated. In other embodiments, the client message is not received until the client is first authenticated by the orchestrating server. As part of the authentication process, the orchestrating server may record information about the news content in an activity log. In some implementations, the activity log also performs a security function. Upon successfully receiving the news content for processing, the orchestrating server may send a confirmation message to the client.

After the client has been authenticated, the orchestrating server receives the news content and additional information that may be included with the new content. Depending upon configuration, the client and orchestrating server may exchange multiple data packets as part of this process. In some embodiments, as described at box 616, this exchange occurs automatically and without human intervention.

When the news content has been successfully received, an entry may be added to a processing queue at the orchestrating server. This entry, for example, may include an identifier that uniquely identifies the news story among other news stories that have been queued for processing. In addition, using the unique identifier, the orchestrating server may reorder items in the processing queue according to their specific priorities and other handling instructions. Attributes and additional message data may be used in this process. For example, "Urgent" or "Flash" priority news content may be placed at the head of the queue for immediate processing ahead of "Advance" news content in the processing queue. This activity is shown box 620.

At box 624, processing of the news story at the head of the queue begins. In light of the present disclosure, persons of skill in the art will understand that the orchestrating server is not limited to serial processing, but may concurrently process multiple news stories and may scale to meet particular load requirements. Accordingly, it should be understood that orchestrating server may include one or more servers. Using the attributes and other information contained within the client message, the orchestrating server places the news content in a format that is suitable for distribution to each destination newsroom. Thus, the orchestrating server may produce one or more formatted output files from the same news content. Multimedia news content may also be delivered to a newsroom with, or as part of, the formatted output. Alternatively, as required, the orchestrating server may omit multimedia elements entirely or substitute a link to a stored copy of a multimedia element in each formatted output file.

The orchestrating server may also catalog some or all of the news content for inclusion in a media library. For example, the text of a news story and related multimedia elements may be added to a central database as shown at box 628. Keywords or other identifying information from the client message may be used to index the particular news content for later retrieval. In addition, the orchestrating server may embargo news content by disclosing its existence and possibly distributing some limited part of the news content. Later, at a specified time or when permission to distribute has been provided, the orchestrating server may broadly distribute the entire news content.

At box 632, the orchestrating server sends formatted output to one or more destination newsroom servers. In various embodiments, the orchestrating server may provide the news content in a ready-to-use format to the newsroom servers according to their capabilities. Thus, delivery of the formatted output happens automatically and special configuration of the newsroom servers is generally not required. Depending upon the particular destination, the orchestrating server may appear to be a wire service news source and may provide output in the ANPA format. In such cases, news content from the orchestrating server may sometimes be indistinguishable from other wire service transmissions. In some embodiments, as illustrated above, an IP-to-serial conversion of the formatted output may be performed before the message is provided to a newsroom server.

FIG. 7 shows an example of formatted output produced according to an embodiment of the present invention. The formatted output is depicted as it might appear at a wire service news terminal. A plurality of fields, some of which are represented by non-printable control characters or sequences, are included with text of a news story. Thus, for example, square boxes appear in place of control sequences such as may indicate the start of a message. Similarly, alphanumeric characters embedded at various places may indicate format-specific information. By way of illustration, "f" included at a particular location in the output may signify a Flash priority news item. As shown, an address to related multimedia content (https://newspad.domain.com . . . jpg) is also included.

Additionally, as shown the text content: "line 1, line 2, line 3, line 4, cr If fix testing" (the "news") is illustrated in the body of the story.

FIG. 8 is a pseudocode representation of another exemplary formatted output produced according to one embodiment of the present invention. As illustrated, comments appear in curly braces and special characters are enclosed in angular brackets. The exemplary formatted output includes a message header comprising three special characters followed by various fields of information that are separated by field delimiters. This collection of data and special characters provides scheduling, formatting, and distribution information that enables the formatted output to be transmitted by a wire-based news service. For example, as shown, news content of the formatted output may be scheduled for nationwide distribution (service level), prioritized as a news bulletin (priority), categorized as a domestic news story (category), and formatted with tabular formatting (format). The news content of the formatted output may also be characterized by keywords and may include a reference to a previous news item. In some embodiments, an orchestrating server may be programmed with flexible rules to produce similar output for distribution to one or more newsroom servers.

Figure 9:
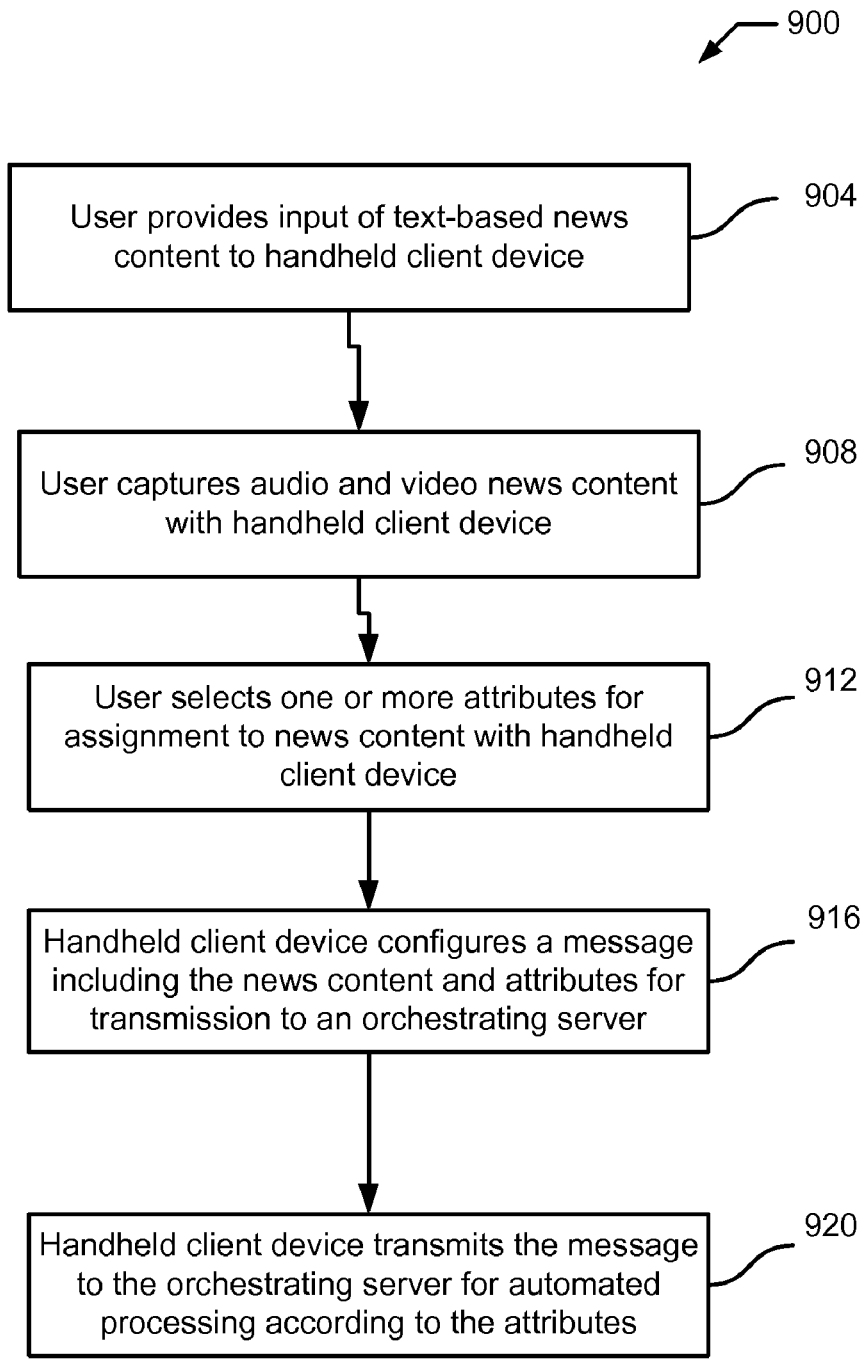
FIG. 9 is a flowchart illustrating a method by which news content may be received and transmitted using a client device according to embodiments of the present invention.

FIG. 9 is a flowchart illustrating a method by which news content may be received and transmitted using a client device according to embodiments of the present invention. At step 904, a hand-held client device receives input of news content from a user. Initially, for example, a reporter may enter the text of a news story into the client device, as described above. At step 908, the user captures audio/video data for inclusion as part of the news content. Thus, the reporter may also use the client device to take photographs or record audio and/or video clips related to the text of the news story.

At step 912, the user uses the above referenced thin client software to select one or more attributes for assignment to the news content. In various embodiments, the attributes are intended to facilitate automatic processing of the news content by a server. The attributes may include scheduling, formatting, and delivery information. Thus, for example, the reporter may select attributes for assignment to the news content indicating that the news content is a sports story, that it is intended for national distribution, that it should be indexed according to certain keyword values, and the like.

At step 916, the client device configures a message with the news content and the selected attributes. In various embodiments, these functions are performed using the thin client software. In various embodiments, the message may be suitable for transmission over a connecting network and may be divided into one or more data packets. In addition, the message may include information necessary to authenticate a user and/or client device to a server. In the next step, the client connects to a wired or wireless connection, as discussed above. After authentication of the user and the client device, at step 920, the message is transmitted over the communications channel to the orchestration server. In some embodiments, the message may be transmitted a predetermined number of times or until the orchestration server acknowledges receipt of the message. If a network connection is not available, the message may be stored and sent at a later time.

Figure 10:
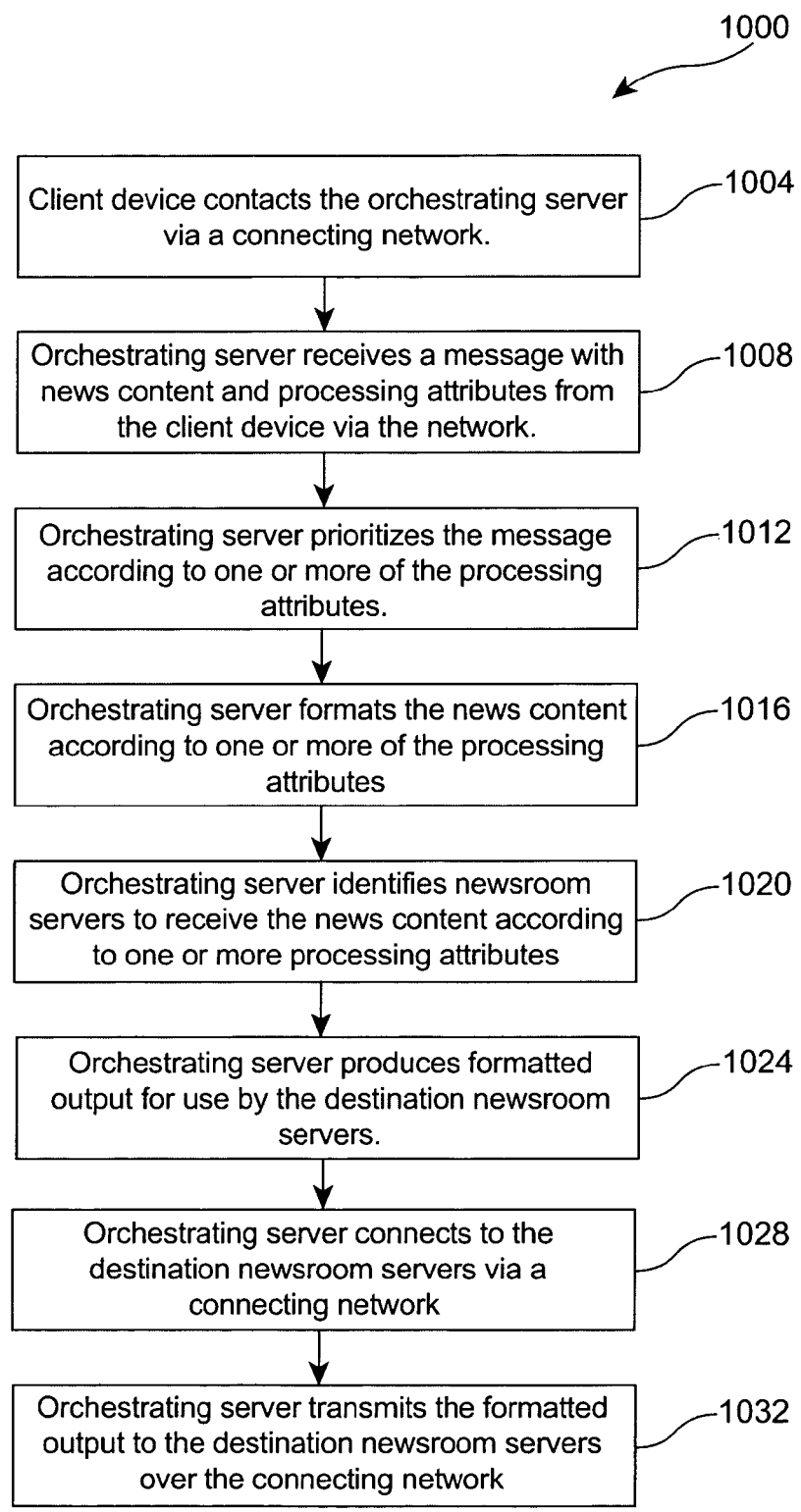
FIG. 10 is a flowchart illustrating a method by which an orchestrating server may process news content according to various embodiments of the present invention.

FIG. 10 is a flowchart illustrating a method by which an orchestrating server may process news content according to various embodiments of the present invention. At step 1004, a client device contacts the orchestrating server via a connecting network. As previously described, this transaction may be performed via different types of communications channels and using different network protocols.

Next, at step 1008, the orchestrating server receives a message from the client device for processing. The message, for example, may be received from a client device operating in a remote location and may contain news content and processing attributes, as discussed above. In a batch of operations, the news content is prepared for distribution to one or more newsrooms. In some embodiments, multiple processing steps are performed for each destination newsroom. Although shown as a sequence, in light of the present disclosure, it is believed that persons of ordinary skill in the art will understand that many of these operations may be performed concurrently.

The message received from the client device may contain one or more scheduling attributes. At step 1012, the orchestrating server may use these scheduling attributes to control how the message is processed. For example, the orchestrating server may place the message into a processing queue according to its scheduling attributes. The orchestrating server may also use the scheduling attributes when it produces formatted output for distribution to a newsroom server. For example, the orchestrating server may include a priority value in the formatted output that corresponds to one or more scheduling attributes.

At step 1016, the news content is formatted for distribution according to its attributes. In various embodiments, one or more attributes may be used by the orchestrating server to control how the news content is formatted. In various embodiments, depending upon the ingest requirements of a particular newsroom, the news content may be rearranged and formatted into a number of different output formats. In various examples, the news content may be formatted according to wire service transmission guidelines, such as the ANPA format (described above), a syndication format, such as RSS, or the like. Additionally, the news content may be placed into one or more other standard or proprietary formats.

At step 1020, the orchestrating server identifies one or more destination newsroom servers to receive the formatted output. In various embodiments, the orchestrating server may use one or more delivery attributes from the client message for this purpose. For example, the delivery attributes may identify a specific newsroom server to receive the news content or they may include more complicated routing instructions. In some embodiments, the delivery attributes may represent or distribution list or alias. In other embodiments, the orchestrating server maintains its own list of newsroom servers that can receive formatted output. In various examples, one distribution list may include only East coast affiliates; one distribution list may include only affiliates who opt-in to a specific distribution list; and the like. In some embodiments, the orchestrating server may merge the lists or ignore the delivery attributes list.

It will be understood that the orchestrating server may use the scheduling, formatting, and delivery attributes in any number of ways to produce formatted output for distribution to one or more newsroom servers. Attributes may be interrelated and may also be mixed with information stored at the orchestrating server. Thus, for example, the orchestrating server may use delivery attributes to locate information about the ingest requirements of a particular destination newsroom server. The ingest requirements, in turn, may further specify how the news content should be scheduled, formatted, or delivered for use by the particular newsroom server.

After the news content has been processed, formatted output is produced for distribution to one or more newsrooms. This is shown at step 1024. In various embodiments, multiple output files may be produced from the same news content. Similarly, each destination newsroom may receive one or more output files appropriate to its particular ingest requirements. In light of the present disclosure, persons of skill in the art will recognize that many different types of formatted output are possible and within the scope of the present invention.

Next, in this embodiment, at steps 1028, the orchestrating server establishes a connection to one or more destination newsroom servers. As indicated previously, this connection may include different computer networks, communication networks, and networking protocols which depend upon the particular destination newsroom. When the connection is made, at step 1032, the orchestrating server transmits the formatted output to each destination newsroom server to complete the news delivery process. As can be seen, the orchestration server can automatically receive and process messages and provide formatted output to newsrooms according to attributes specified in the messages.

The present invention may be implemented in digital electronic circuitry, or in computer hardware, firmware, software, or in combinations thereof. An apparatus according to the invention can be implemented in computer program products tangibly embodied in a machine-readable storage device for execution by a programmable processor. The invention can be implemented advantageously in one or more computer programs that are executable on a programmable system including: at least one programmable processor coupled with a data storage system, at least one input device, and at least one output device. Data and instructions may be carried between the programmable processor and other components by a bus or similar architecture as known in the art.

Computer programs of the present invention can be expressed using a high-level procedural or object-oriented programming language, or in assembly or machine language if desired. Program code may be compiled or interpreted. Suitable processors include, by way of example, general and special purpose microprocessors. Generally, a processor will receive instructions from a read-only and/or a random access memory. A computer will typically include one or more mass storage devices for storing data files. These devices may include magnetic disks, such as internal hard disks and removable disks, magneto-optical disks, and optical disks. Storage devices suitable for tangibly embodying computer program instructions and data include all forms of non-volatile memory including, for example, semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In light of the above disclosure, it should be apparent that the present invention has many applications. In disclosing embodiments of remote news delivery systems, only a few of the possible variations were described. Additional variations, combinations of the above embodiments, and related applications will be readily apparent to those of ordinary skill in the art. Therefore, the present invention is not limited in scope to the embodiments described, but should be construed broadly with reference to the appended claims.

What is claimed is:

1. A method comprising:
    receiving, by a client device, news content from a user, the news content including a news story to be disseminated to a plurality of news providers;
    assigning, by the client device, to the news content at least a priority attribute representing a priority of the news content and a category attribute representing a category of the news content, wherein the priority attribute is selectable from a set of priority values recognized by a server as valid priority values and the category attribute is selectable from a set of category values recognized by the server as valid category values, thereby ensuring that when the server processes the news content automatically, the priority value and the category value used are valid, wherein the priority attribute corresponds to a field defined in a standard wire service format and the category attribute corresponds to a field defined in the standard wire service format, and wherein the set of attributes further includes a a third attribute representing a headline associated with the news content, and a fourth attribute representing keywords in the news content;
    configuring, by the client device, a message with the news content and the priority attribute and the category attribute, wherein the message has a predetermined format that allows the server to perform automated processing; and
    transmitting the message from the client device to the server for automated dissemination of the news content to the plurality of news providers according to at least the priority attribute and the category attribute.

2. The method of claim 1 wherein the news content includes text and multimedia data elements.

3. The method of claim 1 wherein the at least one attribute permits the news content to be selectively distributed by a news provider.

4. The method of claim 1 further comprising capturing audio and video data for inclusion as part of the news content.

5. The method of claim 4 further comprising transmitting the audio and video data to the server after transmitting the message.

6. The method of claim 5 wherein the message includes a link to the audio and video data.

7. The method of claim 1 wherein the predetermined format includes XML data, and wherein the at least one attribute is represented by an XML tag.

8. The method of claim 1 further comprising encrypting the message prior to transmission.

9. The method of claim 1 wherein the standard wire service format is American Newspaper Publishers Association (ANPA) format.

10. The method of claim 1 wherein the user is a news reporter.

11. A method comprising:
    receiving, by a client device, news content from a user, the news content including a news story to be disseminated to a plurality of news providers;
    providing, by the client device, a list of one or more attributes for selection by the user, wherein the list includes at least one attribute corresponding to a field defined in a standard wire service format, and wherein the list of attributes includes a first attribute representing a priority of the news content, a second attribute representing a category of the news content, a third attribute representing a headline associated with the news content, and a fourth attribute representing keywords in the news content, wherein at least one news story to be disseminated is assigned a priority attribute representing a priority of the news content and a category attribute representing a category of the news content, wherein the priority attribute is selectable from a set of priority values recognized by a server as valid priority values and the category attribute is selectable from a set of category values recognized by the server as valid category values, thereby ensuring that when the server processes the news content automatically, the priority value and the category value used are valid, wherein the priority attribute corresponds to a field defined in the standard wire service format and the category attribute corresponds to a field defined in the standard wire service format;

assigning, by the client device, a value to an attribute in the list based upon user selection; and configuring, by the client device, a message with the news content and the assigned attribute, including the priority attribute and the category attribute, wherein the message has a predetermined format accepted by the server.

12. The method of claim 11 wherein the standard wire service format is American Newspaper Publishers Association (ANPA) format.

13. An apparatus comprising:

a processor configured to:
   a) receive input of news content from a user, the news content including a news story to be disseminated to a plurality of news providers;
   b) receive input of at least one attribute selected from a set of attributes recognized by a server for processing the news content, wherein the at least one attribute corresponds to a field defined in a standard wire service format, wherein the set of attributes includes a first attribute representing a priority of the news content, a second attribute representing a category of the news content, a third attribute representing a headline associated with the news content, and a fourth attribute representing keywords in the news content, wherein at least one news story to be disseminated has a priority attribute representing a priority of the news content and a category attribute representing a category of the news content, wherein the priority attribute is selectable from a set of priority values recognized by a server as valid priority values and the category attribute is selectable from a set of category values recognized by the server as valid category values, thereby ensuring that when the server processes the news content automatically, the priority value and the category value used are valid, wherein the priority attribute corresponds to a field defined in the standard wire service format and the category attribute corresponds to a field defined in the standard wire service format; and
   c) configure a message including the news content and the at least one attribute, including the priority attribute and the category attribute, the message having a predetermined format accepted by the server;

a display adapted to present information about the news content and the at least one attribute to the user; and a network controller adapted to transmit the message to the server over a connecting network.

14. The apparatus of claim 13 wherein the standard wire service format is American Newspaper Publishers Association (ANPA) format.

* * * * *

UNITED STATES PATENT AND TRADEMARK OFFICE
CERTIFICATE OF CORRECTION

| | |
|---|---|
| PATENT NO. | : 8,364,757 B2 |
| APPLICATION NO. | : 11/535405 |
| DATED | : January 29, 2013 |
| INVENTOR(S) | : Thomas C. Scott and John C. Chybinski |

It is certified that error appears in the above-identified patent and that said Letters Patent is hereby corrected as shown below:

In the Claims:
Column 16, Claim 1, Line 11: delete "further includes a a third" and insert --further includes a third--

Signed and Sealed this
Twenty-ninth Day of October, 2013

Teresa Stanek Rea
*Deputy Director of the United States Patent and Trademark Office*